United States Patent [19]

Breslin

[11] Patent Number: 5,794,656
[45] Date of Patent: Aug. 18, 1998

[54] BALL CHECK VALVE WITH OFFSET OPEN BALL MOVEMENT

[75] Inventor: Michael K. Breslin, Mill Valley, Calif.

[73] Assignee: Clean Environment Engineers, Oakland, Calif.

[21] Appl. No.: 635,099

[22] Filed: Apr. 17, 1996

[51] Int. Cl.$^6$ ............................................. F16K 15/04
[52] U.S. Cl. ............................................. 137/533.11
[58] Field of Search ............... 137/533.11, 533.13, 137/533.15, 539, 539.5

[56] References Cited

U.S. PATENT DOCUMENTS

| | | | |
|---|---|---|---|
| 1,377,407 | 5/1921 | Depew | 137/533.11 |
| 1,989,199 | 1/1935 | Hummert | 137/533.13 |
| 3,768,509 | 10/1973 | Goda | 137/539 |
| 4,069,840 | 1/1978 | Brown et al. | 137/533.11 |
| 4,091,839 | 5/1978 | Donner | 137/539 |
| 4,346,731 | 8/1982 | Sigworth | 137/533.11 |

*Primary Examiner*—Marguerite McMahon
*Attorney, Agent, or Firm*—Townsend and Townsend and Crew LLP

[57] ABSTRACT

An improved ball retaining mechanism is disclosed in combination with an improved valve body for maintaining a checking ball within a ball check valve. The valve body includes a central conduit configured about a flow axis passing from the valve inlet to the valve outlet. Adjacent the valve inlet, there is defined a Venturi contoured seat. When an inserted checking ball is lodged on the seat, fluid flow from the outlet to the inlet is stopped. Beyond the seat, an expanded valve flow chamber is defined communicating to the valve outlet having sufficient volume to accommodate both the lifted checking ball and fluid flow around the lifted checking ball from inlet to outlet. The improvement to the valve body includes a the spring steel wire retainer and an interior annulus in the valve body at the expanded flow volume for receiving a spring steel wire retainer. A spring steel wire retainer is provided having a circular section and ball retaining tangs. The circular section is provided with a diameter slightly exceeding the diameter of the interior annulus and an arc less than 360° (330° circular section being preferred) to permit elastic expansion and contraction. At least one tang extends from the circular section having sufficient length and dimension with respect to the expanded flow volume to retain the checking ball in the expanded flow volume.

7 Claims, 4 Drawing Sheets

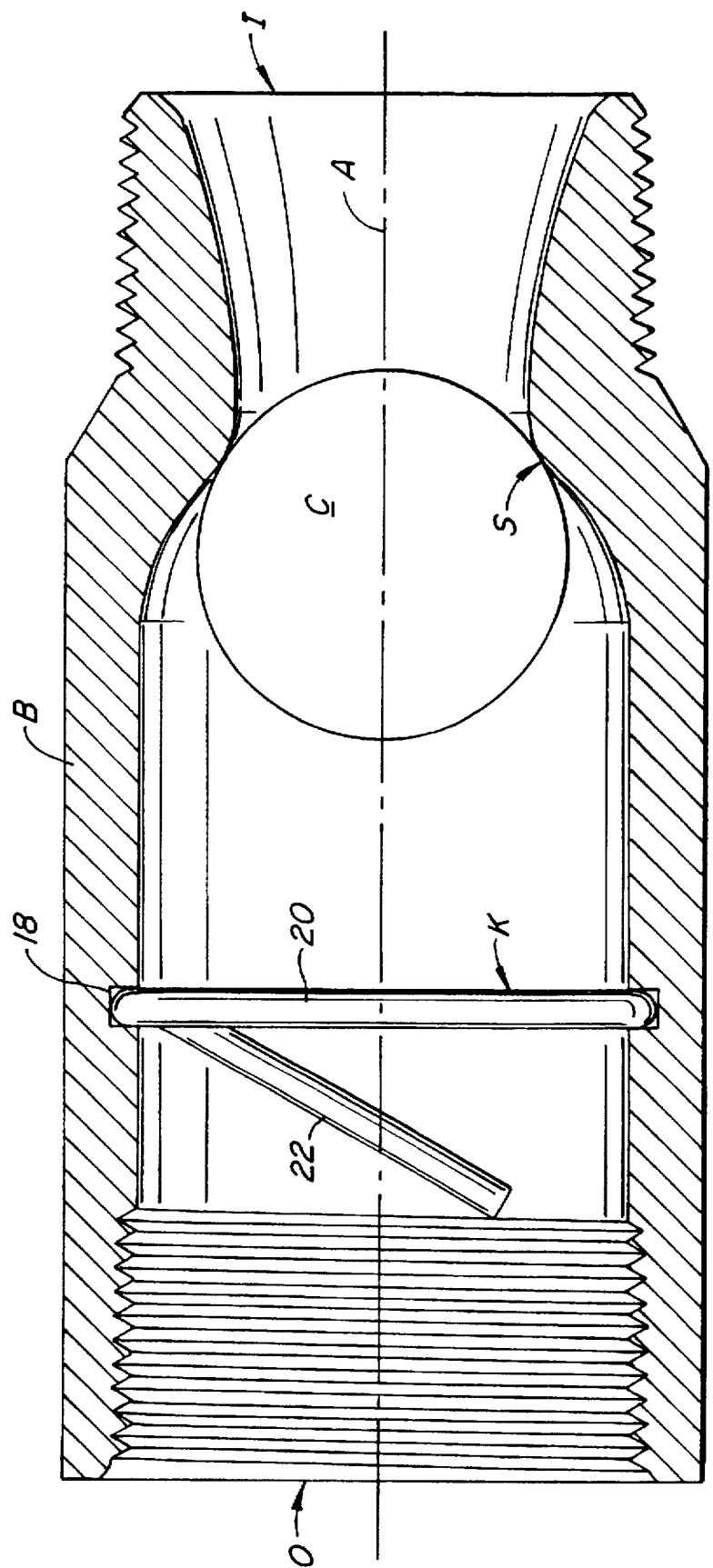

BALL CHECK VALVE WITH OFFSET OPEN BALL MOVEMENT

This invention relates to ball check valves. More particularly, a ball check valve is configured with a ball retainer for maintaining the ball off center of the main flow path when the valve is open.

BACKGROUND OF THE INVENTION

Ball check valves are known. Typically, a ball check valve includes a valve body defining a central conduit having an inflow port at one end of the valve body and an outflow port at the opposite end of the valve body. From inlet to outlet, the central conduit of the valve body restricts to a seat and thereafter expands to an expanded flow volume above the seat.

The ball forming the closure at the seat of the valve body is inserted from the outlet of the central conduit toward the inlet of the central conduit. The seat has a size which prevents passage of the ball through the seat to the inlet. When the ball is on the seat, the ball obstructs fluid flow in a fluid tight manner.

Overlying the ball seat in the central conduit there is an expanded flow volume extending to and toward the valve outlet. This expanded volume permits the ball to lift from the seat into the expanded volume, and fluid to pass from the inlet, around the lifted ball, and out the outlet.

Finally, it is necessary to retain the ball within the expanded volume overlying the seat. This being the case, all measure of retention devices have been utilized. As will hereafter be understood, this invention includes an improvement to a ball retention device in the expanded flow volume overlying the valve seat.

Ball check valves have not been without difficulty. These difficulties include ball rattling in the passing fluid flow from inlet to outlet through the central conduit of the valve. This ball rattling induces wear on the ball and valve seat. Further, many ball check valves include excessive pressure drop across the valve, this being due to inadequate central conduit sizing, the ball retention device, or the dynamic movement of the ball in the fluid flow when fluid passes from inlet to outlet.

SUMMARY OF THE INVENTION

An improved ball retaining mechanism is disclosed in combination with an improved valve body for maintaining a checking ball within a ball check valve. The valve body includes a central conduit configured about a flow axis passing from the valve inlet to the valve outlet. Adjacent the valve inlet, there is defined a Venturi contoured seat. When an inserted checking ball is lodged on the seat, fluid flow from the outlet to the inlet is stopped. Beyond the seat, an expanded valve flow chamber is defined communicating to the valve outlet having sufficient volume to accommodate both the lifted checking ball and fluid flow around the lifted checking ball from inlet to outlet. The improvement to the valve body includes a the spring steel wire retainer and an interior annulus in the valve body at the expanded flow volume for receiving a spring steel wire retainer. A spring steel wire retainer is provided having a circular section and ball retaining tangs. The circular section is provided with a diameter slightly exceeding the diameter of the interior annulus and an arc less than 360° (330° circular section being preferred) to permit elastic expansion and contraction. At least one tang extends from the circular section having sufficient length and dimension with respect to the expanded flow volume to retain the checking ball in the expanded flow volume. Two parallel tangs are preferred, which are typically straight and bent out of the plane of the circular section of the spring steel wire retainer to extend at an angle with respect to the flow axis of the central conduit.

Valve assembly can be easily understood. A checking ball is inserted to the central valve conduit at the outlet and allowed to fall towards the valve inlet. The spring steel wire retainer is grasped at its respective tangs. The tangs are compressed to and toward one another until compression of the circular section of the spring steel wire retainer occurs to a diameter where the circular section of the spring steel wire retainer fits to the annulus in the expanded flow volume overlying the seat. When such seating occurs, the tangs are released and the spring steel wire retainer held firmly interior of the central valve conduit trapping the checking ball at the extending tangs.

Operation is easy to understand. Fluid movement from the outlet toward the inlet causes the checking ball to be forced on the valve seat with prevention of flow.

Fluid movement from inlet to outlet lifts the checking ball free of the seat and into the expanded flow volume overlying the seat. The checking ball is entrained in the fluid flow until it encounters the tangs. Remembering that the tangs are angularly inclined with respect to the axis of the central conduit, the checking ball tends to roll along the tangs to the side of the central flow conduit. Reaching the side of the central flow conduit, the checking ball is held statically against the side of the expanded flow volume in a three point support with two points of rest being on the tang and a third against the valve body at the expanded flow volume.

Improved flow results. The checking ball cannot rattle. Further, since the checking ball is biased out of center of the central flow conduit, passage of fluid with reduced pressure drop can occur. Thus, there is added to a ball check valve having simplified assembly an improved ball movement for permitting fluid flow from valve inlet to valve outlet.

The tangs perform double duty in that they are (1) the mechanisms which allow the assembler to decrease the pin O.D. and get the clip in and out of the valve body and (2) serve to guide the checking ball to the side of the valve body to improve flow and protect the ball by getting it out of the flow stream. If it were in the flow stream, it would rattle back and forth across the valve body and receive wear.

BRIEF DESCRIPTION OF THE DRAWINGS

FIG. 2 is a side elevation of the valve of FIGS. 1A and 1B illustrating the checking ball on the valve seat for the prevention of fluid flow from outlet to inlet;

DESCRIPTION OF THE PREFERRED EMBODIMENT

Figure 1A:
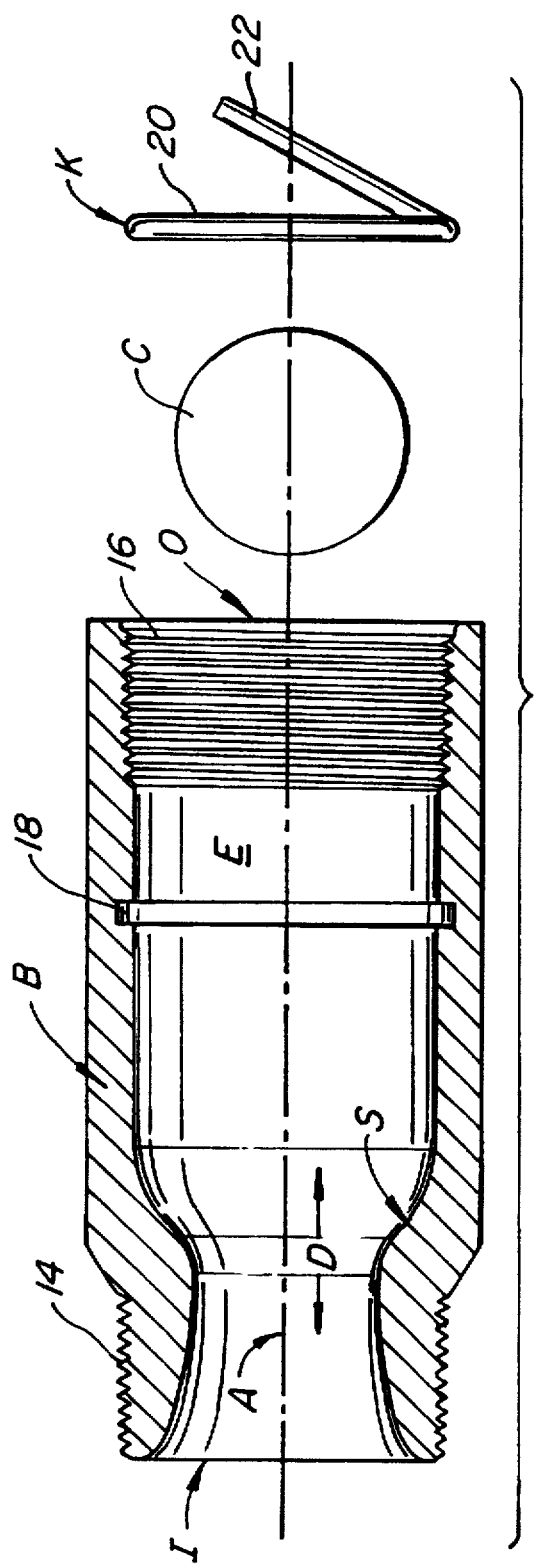
FIG. 1A is an exploded view of the ball check valve of this invention illustrating respectively the valve body, the checking ball, and the ball retaining clip in side elevation.

Referring to FIG. 1A, valve body B is shown having central flow conduit D having inlet I at one end and outlet O at the opposite end. Here, central flow conduit D is symmetrical about axis A and defines internally seat S. It will be observed that seat S is Venturi shaped for low pressure drop when fluid interior of central flow conduit D of valve body B flows from inlet I to outlet O. From seat S towards outlet O, central flow conduit D defines expanded flow volume E. As will hereafter be emphasized, expanded flow volume E has sufficient volume to accommodate lifted checking ball C and permit fluid flow from inlet I to outlet O. Valve body B further includes external threads 14 adjacent inlet I and internal threads 16 adjacent outlet O.

Expanded flow volume E contains inside annulus 18. As will hereafter be set forth, inside annulus 18 is the place of attachment of clip K for retaining checking ball C within expanded flow volume E.

Checking ball C is preferably a sphere having a dimension with respect to seat S so that when fluid flow occurs from outlet to inlet, seating of checking ball C on seat S causes flow stoppage.

Figure 1B:
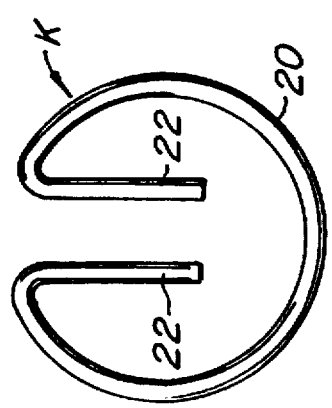
FIG. 1B is a plan view of the ball retaining clip.

Checking ball C is held within expanded flow volume E by clip K. Clip K is best understood by viewing FIGS. 1A and 1B simultaneously. Clip K includes circular portion 20 and tangs 22. Circular portion 20 extends approximately 330° and has a diameter slightly exceeding the diameter of inside annulus 18. By compression of circular portion 20, seating of clip K at inside annulus 18 easily occurs.

Clip K further includes pair tangs 22. As can be seen, tangs 22 are angularly inclined with respect to both the plane of circular portion 20 and axis A of central flow conduit D at expanded flow volume E. The preferred inclination is here 30°. Generally, tangs 22 are two in number, extend parallel to one another, are straight in their extension from circular portion 20, and have sufficient length to prevent checking ball C from escaping from expanded flow volume E. It will be understood that a single tang can suffice. Further, the tang does not have to be straight and the inclination can be changed to suit alternate designs of central flow conduit D.

Having fully described the valve, assembly can be easily understood. Checking ball C is inserted from outlet O toward seat S and inlet I. Thereafter, clip K is inserted, with tangs 22 being compressed one towards another. Thereafter, circular portion 20 is registered to inside annulus 18. Release of tangs 22 occurs and clip K is held in place.

Operation is easy to understand. Presuming that fluid flows from outlet O to inlet I, checking ball C seats on seat S. Flow stoppage occurs.

Figure 3:
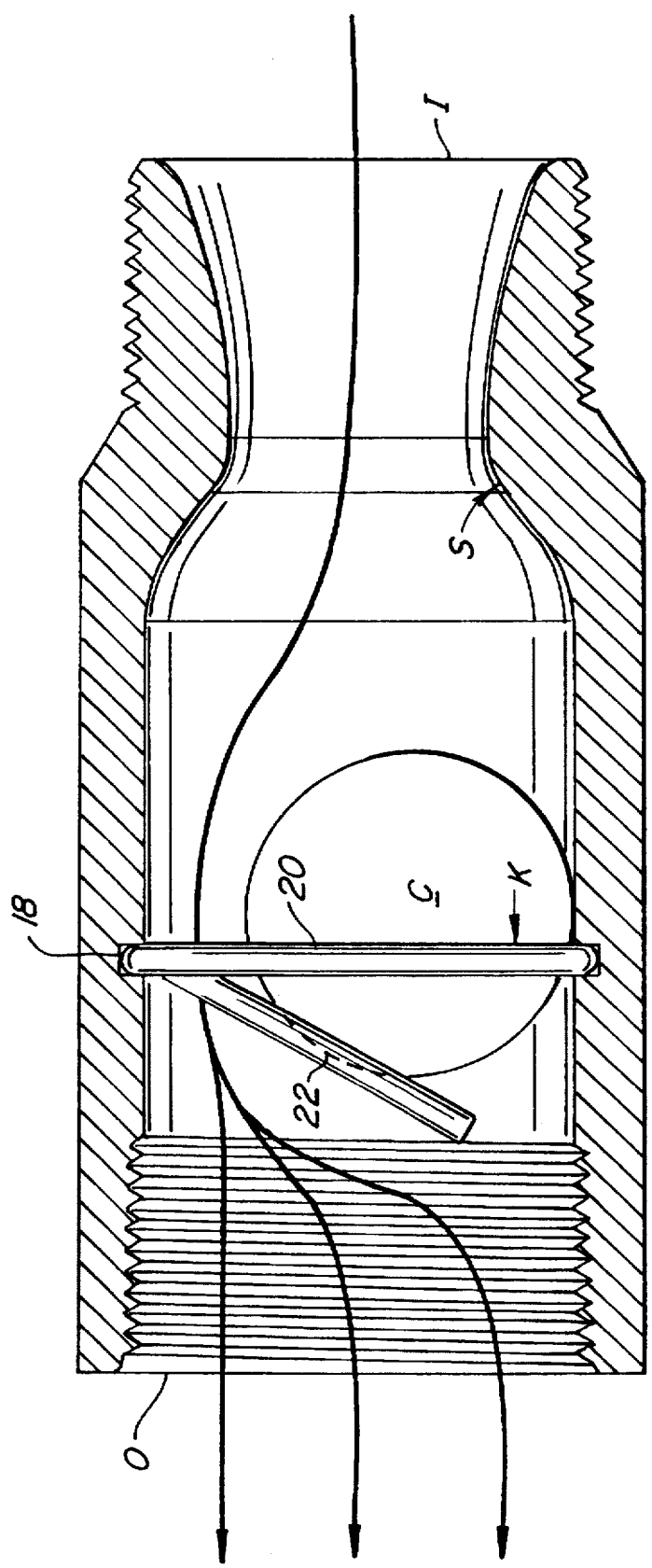
FIG. 3 illustrates a side elevation similar to FIG. 2 with the checking ball shown lifted into the expanded flow volume above the seat and the fluid entrained ball lifted free of the seat into contact with the ball retaining clip with a stable and static three point seating on the two tangs of the clip and at the side wall of the valve body; and, FIG. 4 is an alternate embodiment of the valve illustrating an enlarged expanded flow volume above the valve seat with the ball illustrated biassed to the side for an extreme low pressure drop flow of fluid through the valve.

Referring to FIG. 3, and presuming that fluid flows from inlet I to outlet O, checking ball C lifts free of seat S. Entrainment of checking ball C occurs until contact is made with clip K at tangs 22. Checking ball C then rolls along tangs 22 until contact is made with valve body B in central flow conduit D within expanded flow volume E.

It will be noted that the resting of checking ball C on tangs 22 is a stable, three point support. Checking ball C will rest on three points, two being on tangs 22 and one point on central flow conduit D within expanded flow volume E. As held at these respective three points, checking ball C will not have tendency to rattle, move or otherwise wear valve body B at central flow conduit D.

I here show tangs 22 of clip K extending from inside annulus 18 toward outlet O. One can readily see that if clip K is reversed, the valve will function nearly as well.

Figure 4:
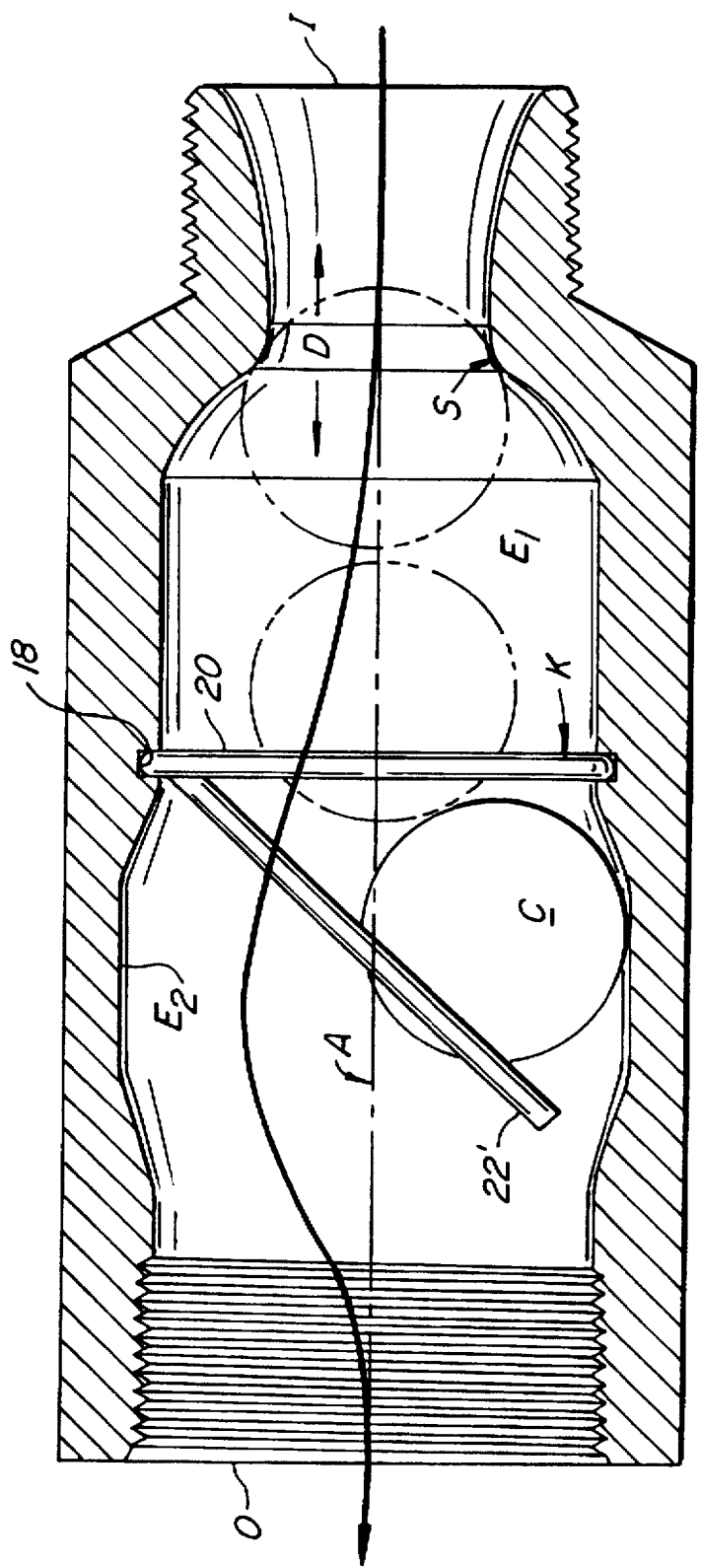

It will be understood that this invention will admit of modification. Referring to FIG. 4, such a modification is illustrated having an embodiment of this invention that has extreme low pressure drop when fluid flows from inlet I to outlet O.

Referring to FIG. 4, it will be seen that two expansion volumes are utilized. First expanded flow volume $E_1$ is immediately above seat S. Second expanded flow volume $E_2$ communicates to slightly smaller first expanded flow volume $E_1$ and further expands central flow conduit D. The function of these dual flow volumes can be easily understood.

Specifically, checking ball C will lift free of seat S and pass into first expanded flow volume $E_1$. Entrainment will continue to occur. Checking ball C will then pass into second expanded flow volume $E_2$ and come into contact with tangs 22'. Checking ball C will roll along tangs 22' and into a three point stable support with one support point on each tang and one support point on central flow conduit D. Stable support of checking ball C will occur.

It will be noted that checking ball C only occupies a small fraction of second expanded flow volume $E_2$. This enables this embodiment to produce an extreme low pressure drop in the open position.

What is claimed is:

1. In the combination of a ball check valve having:
   a valve body;
   a valve inlet;
   a valve outlet;
   a valve flow conduit extending from the valve inlet to the valve outlet, the valve flow conduit being defined about a flow axis extending from the valve inlet to the valve outlet;
   a valve seat having a constricting diameter configured within the valve flow conduit;
   an expanded flow volume defined within the valve flow conduit between the valve seat and valve outlet;
   a checking ball for moving to and from the valve seat at the constricting diameter respectively out of and into the expanded flow volume; and
   means for retaining the checking ball within the expanded flow volume;
   the improvement to the means for retaining the checking ball within the expanded flow volume comprising:
   an annulus configured in the valve body within the expanded flow volume above the valve seat;
   a spring ball retaining clip including a circular portion having a dimension exceeding the annulus with less than 360° circumference and at least one tang protruding from the circular portion;
   the at least one tang bent at an angle with respect to the flow axis of the valve flow conduit to cause checking ball displacement along the tang to the side of the expanded flow volume.

2. In the combination of a ball check valve according to claim 1 and further including:
   at least two tangs protruding from circular portion of the spring ball retaining clip.

3. In the combination of a ball check valve according to claim 1 and further including:
   the at least one tang has an angle of about 30° with respect to the axis of the valve flow conduit.

4. In the combination of a ball check valve according to claim 1 and further including:
   the expanded flow volume includes a first and lesser expanded flow volume adjacent the seat of the valve and second and larger expanded flow volume communicated to the first and lesser expanded flow volume; and,
   the at least one tang extends into the second and larger expanded flow volume.

5. A ball check valve comprising:

a valve body;

a valve inlet;

a valve outlet;

a valve flow conduit extending from the valve inlet to the valve outlet, the valve flow conduit being defined about a flow axis extending from the valve inlet to the valve outlet;

a valve seat having a constricting diameter configured within the valve flow conduit;

an expanded flow volume defined within the valve flow conduit between the valve seat and valve outlet;

a checking ball for moving to and from the valve seat at the constricting diameter respectively out of and into the expanded flow volume;

an annulus configured in the valve body within the expanded flow volume above the valve seat;

a spring ball retaining clip including a circular portion having a dimension exceeding the annulus with less than 360° circumference and at least one tang protruding from the circular portion;

the at least one tang bent at an angle with respect to the flow axis of the valve flow conduit to cause checking ball displacement along the tang to the side of the expanded flow volume.

6. A ball check valve according to claim 5 and further comprising:

the at least one tang is straight.

7. A ball check valve according to claim 5 and further comprising:

the expanded flow volume includes a first and lesser expanded flow volume adjacent the seat of the valve and second and larger expanded flow volume communicated to the first and lesser expanded flow volume; and, the at least one tang extends into the second and larger expanded flow volume.

* * * * *